United States Patent
Schulte-Feldmann

[11] Patent Number: 5,966,924
[45] Date of Patent: Oct. 19, 1999

[54] CONNECTING LINK FOR STEEL CONVEYER CHAIN

[76] Inventor: Josef Schulte-Feldmann, Am Golfplatz 2, D-59846 Sundern, Germany

[21] Appl. No.: 09/093,836

[22] Filed: May 20, 1998

[30] Foreign Application Priority Data

Dec. 13, 1997 [DE] Germany .............................. 19755446

[51] Int. Cl.[6] .............................. F16G 15/02; B11L 13/00
[52] U.S. Cl. .................................. 59/84; 59/31; 59/35.1; 59/85
[58] Field of Search .................................. 59/31, 33, 34, 59/84, 35.1, 85

[56] References Cited

U.S. PATENT DOCUMENTS

| | | | |
|---|---|---|---|
| 2,021,157 | 11/1935 | Stahl | 59/31 |
| 2,260,630 | 10/1941 | Mckinnon et al. | 59/31 |
| 2,398,898 | 4/1946 | St Pierre | 59/84 |
| 2,439,522 | 4/1948 | Miller | 59/84 |
| 2,714,798 | 8/1955 | Linnenbank | 59/84 |
| 5,133,179 | 7/1992 | Bernt et al. | 59/31 |

FOREIGN PATENT DOCUMENTS 831041  8/1938  France ........................................ 59/31

*Primary Examiner*—David Jones
*Attorney, Agent, or Firm*—Herbert Dubno; Andrew Wilford

[57] ABSTRACT

A chain connecting link has a C-shape main part having a pair of ends with confronting and spaced end surfaces and a filler part engaged between the ends and having a pair of oppositely directed end surfaces confronting the end surfaces of the main-part ends. Respective bodies of weld metal are engaged between the main-part end surfaces and the filler-part end surfaces so that the filler part solidly interconnects the ends of the main part. The parts are both made of tempered and annealed steel. Each of the end surfaces can be formed by a pair of substantially planar faces meeting at a straight edge. The straight edges extend generally in a plane including a longitudinal center axis of the link and the faces form four laterally open V-shaped notches each holding a respective such body of weld metal. The faces of each surface lie at an obtuse angle to each other. Normally the edges are rounded.

4 Claims, 4 Drawing Sheets

FIG. 7 FIG. 8
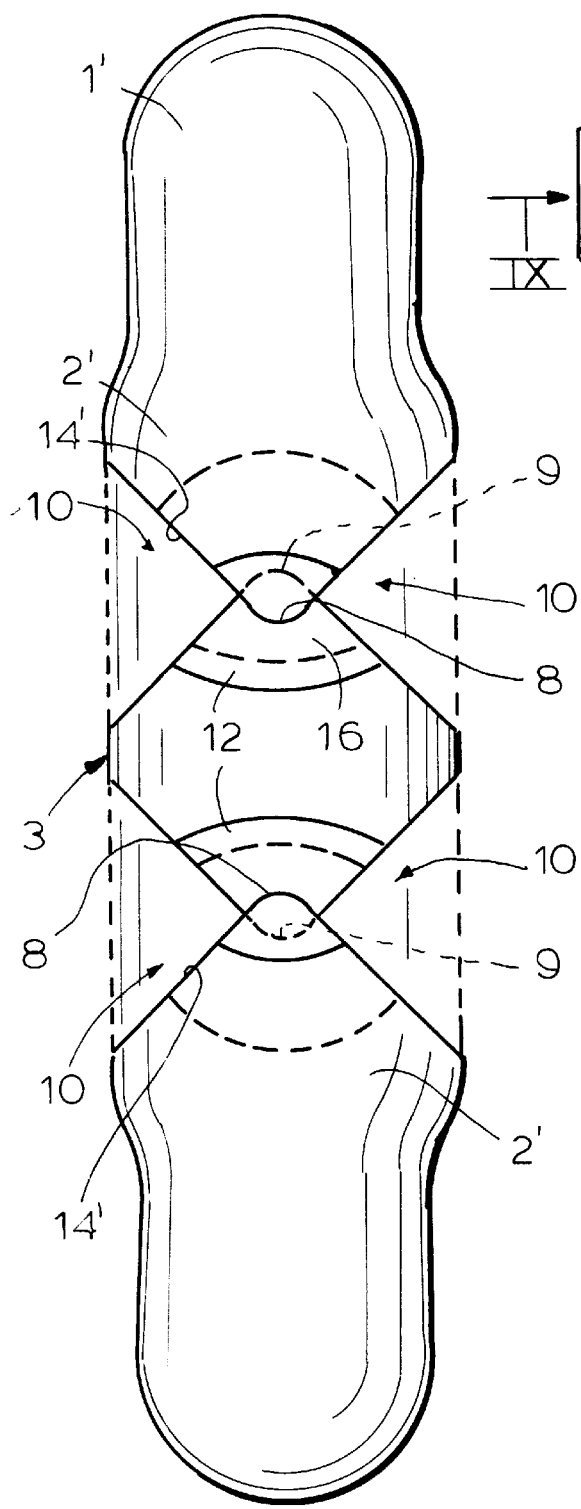
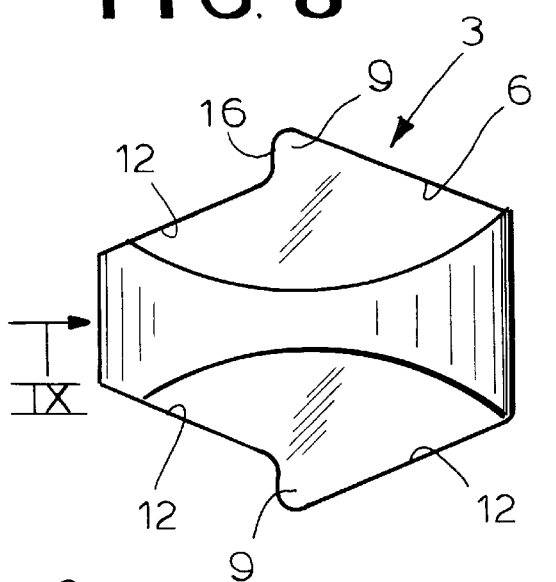
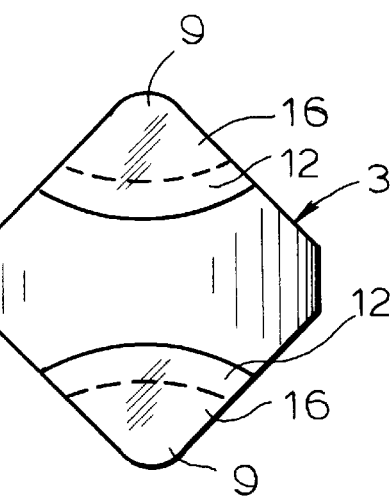
FIG. 9
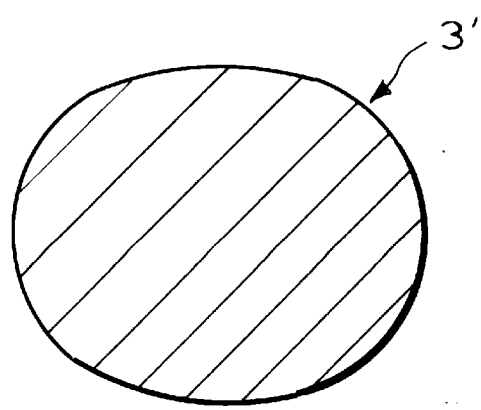
FIG. 10

CONNECTING LINK FOR STEEL CONVEYER CHAIN

SPECIFICATION

FIELD OF THE INVENTION

The present invention relates to a chain connecting link. More particularly this invention concerns such a link used to connect together the ends of a chain used in a mining conveyor or used to displace a mine plow.

BACKGROUND OF THE INVENTION

In large-scale underground mining operations, for instance of coal, it is standard to use conveyors that incorporate very long endless chains, and to use similar chains to convey back and forth the plow that actually cuts material from the face. Such chains are subjected to considerable stress and work in gritty conditions where they are subjected to great wear.

A connecting link with a pivoting and lockable side piece or a double-clevis link is used to join together the ends of the chain into the desired endless loop. Such links are actually the weakest link in the chain, which itself is subjected however representing an annoying maintenance task and unproductive do time for the machine in question.

OBJECT OF THE INVENTION

It is therefore an object of the present invention to provide an improved connecting link for a chain.

Another object is the provision of such an improved connecting link for a chain which overcomes the above-given disadvantages, that is which even in heavy-duty mine use will last as long as the chain it is incorporated into.

SUMMARY OF THE INVENTION

A chain connecting link has according to the invention a C-shaped main part having a pair of ends with confronting and spaced end surfaces and a filler part engaged between the ends and having a pair of oppositely directed end surfaces confronting the end surfaces of the main-part ends. According to the invention respective bodies of weld metal are engaged between the main-part end surfaces and the filler-part end surfaces so that the filler part solidly interconnects the ends of the main part. The parts are both made of tempered and annealed steel.

According to the invention each of the end surfaces is formed by a pair of substantially planar faces meeting at a straight edge. The straight edges extend generally in a plane including a longitudinal center axis of the link and the faces for four laterally open V-shaped notches each holding a respective such body of weld metal. The faces of each surface lie at an obtuse angle to each other. Normally the edges are rounded.

The weld bodies are formed normally by first tacking the parts together with a small-diameter (e.g. 3.25 mm–4 mm) weld rod of an arc-welding rig so as to fill the bases of the V-shaped notches. Then a larger-diameter rod is used to completely fill each V-shaped notch. Such welding is easy to carry out even on the site, underground in a mine if necessary. Arc-welding equipment is easily brought to the work site.

In accordance with another system according to the invention the filler-part and main-part end surfaces are each formed by two inner and one outer generally planar faces. The first and second faces of each surface meet at a substantially straight edge extending generally in a plane including a longitudinal center axis of the link and each end face forms with a confronting end face an outwardly open V-shaped notch filled with a respective one of the weld-metal bodies. More particularly the third face of each surface is set back and defines with the respective two first and second faces a generally triangular surface extending generally parallel to the axis and terminating at the straight edge of the two respective first and second faces When fitted together, these triangular surfaces flatly engage each other, accurately positioning the filler part in the main part for welding.

In this arrangement the first and second faces of each surface extend at a large acute angle to each other. Furthermore according to the invention the filler part is of greater cross-sectional size than the main part.

BRIEF DESCRIPTION OF THE DRAWING

The above and other objects, features, and advantages will become more readily apparent from the following description, reference being made to the accompanying drawing in which:

FIG. 7 is a view taken in the direction of arrow VII of FIG. 6 of the partially welded link;

FIG. 8 is a detail view of the filler piece of the link;

FIG. 9 is a side view taken in the direction of arrow IX of FIG. 8; and

FIG. 10 is a section taken along line X—X of FIG. 8.

SPECIFIC DESCRIPTION

Figure 1:
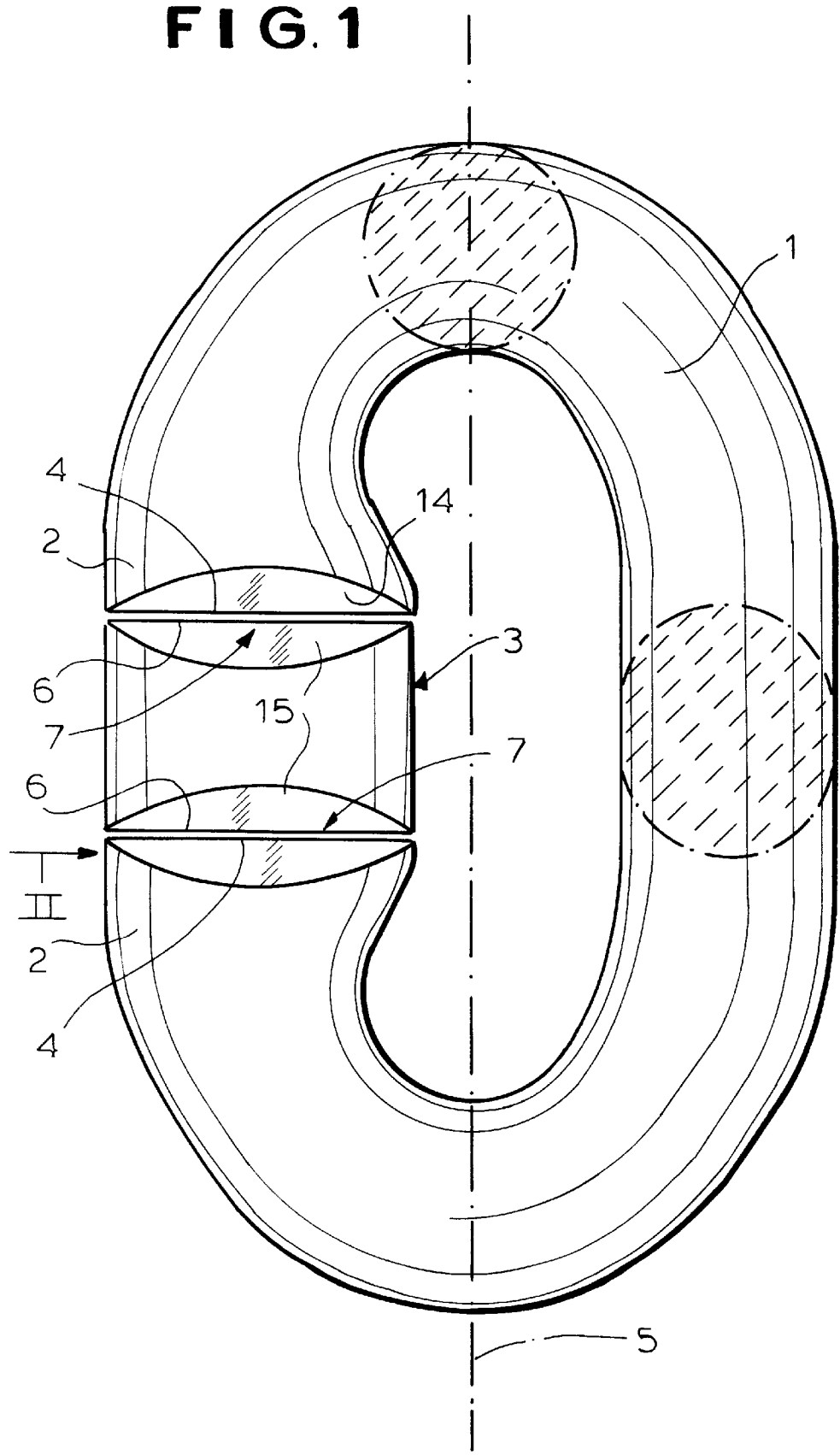
FIG. 1 is a side view of a link according to the invention prior to welding together.
Figure 2:
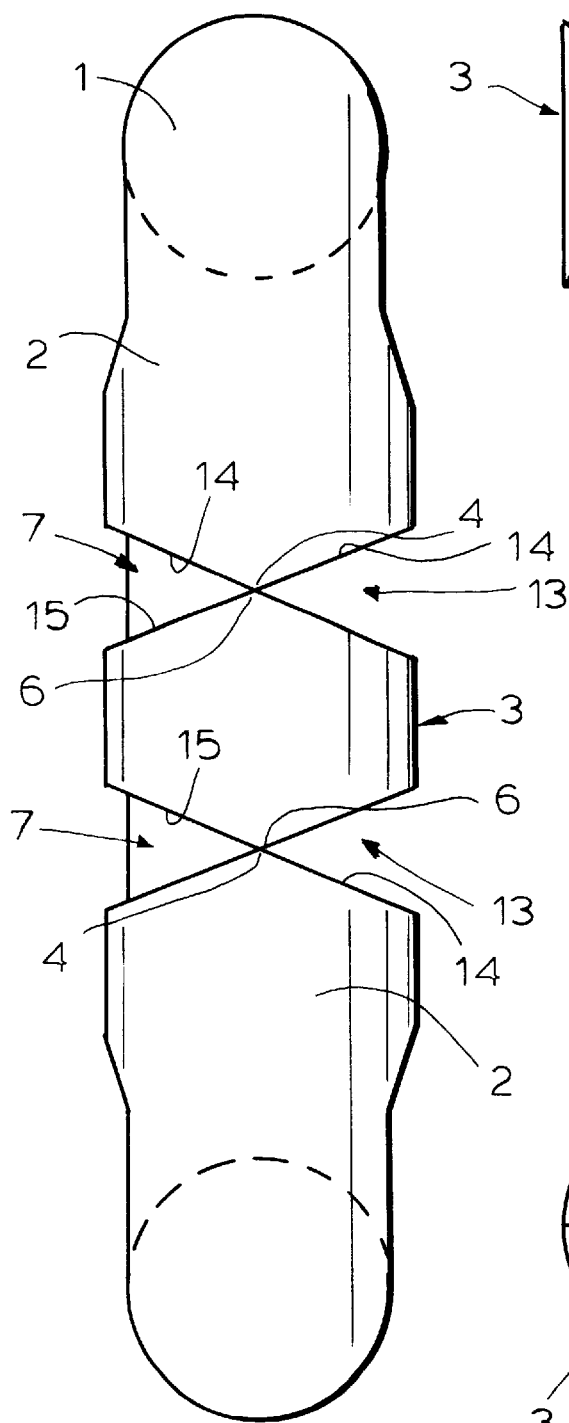
FIG. 2 is a view taken in the direction of arrow II of FIG. 1 of the partially welded link.
Figure 3:
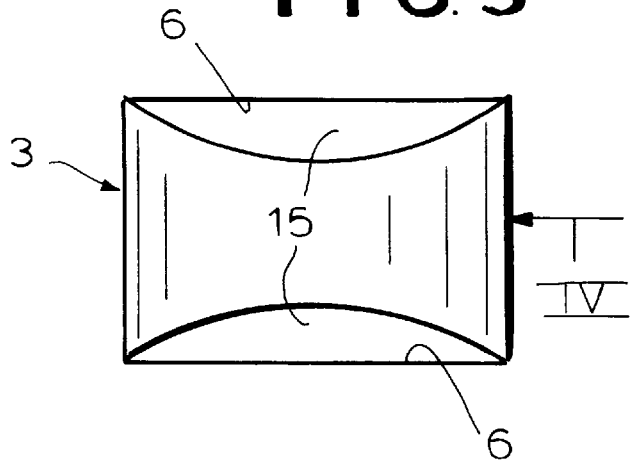
FIG. 3 is a detail view of the filler piece of the link.
Figure 4:
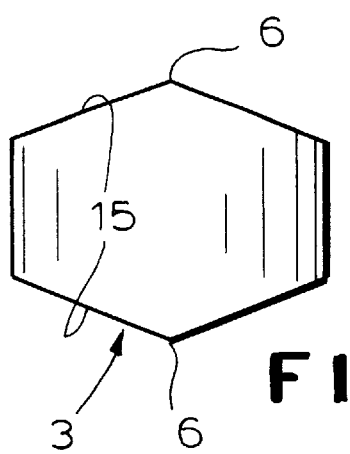
FIGS. 4 and 5 are side and end views taken in the directions of respective arrows IV and V of FIG. 3.
Figure 5:
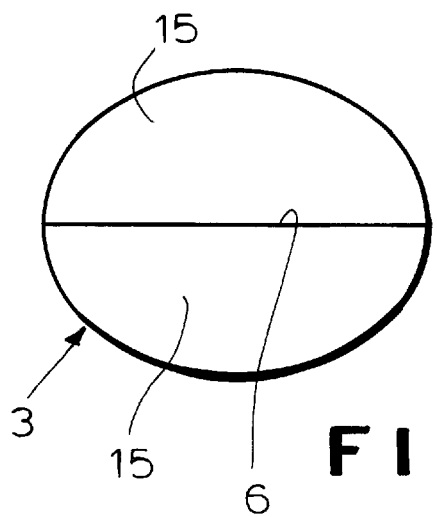
Figure 6:
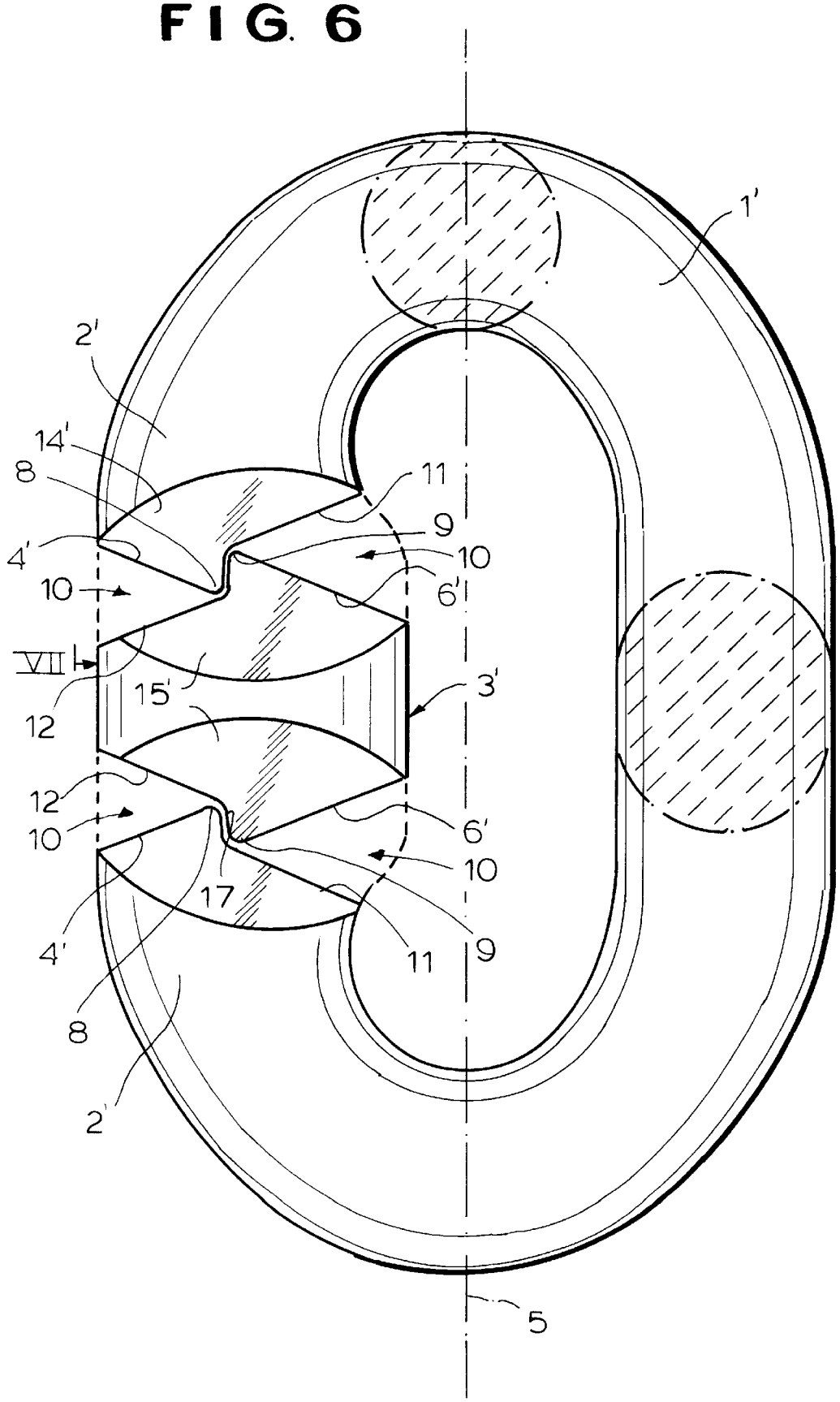
FIG. 6 is a side view of another link according to the invention prior to welding together.

As seen in FIGS. 1 through 5, a connecting link in accordance with the invention comprises a C-shaped main part 1 ending along and centered on a longitudinal axis 5 and having a pair of legs 2 whose outer end surfaces are spaced apart and confront each other. A filler piece 3 fits between the end surfaces of the legs 2. Both the parts 1 and 3 are made of tempered and annealed steel and the bulk of the part 1 is of circular cross section but the ends 2 and filler 3 are of an oval and therefore greater section.

According to the invention the ends of the legs 2 are formed as a pair of flat planar faces 14 that meet at an obtuse angle at a straight rounded edge 4 that extends in a plane including the axis 5 and that, if extended, would intersect this axis 5 at a right angle. The outer ends of the filler piece 3 are each identically formed with a pair of semicircular planar faces 15 meeting at a rounded edge 6 that extends parallel to the respective edge 4.

Such a link 1, 3 is used by first hooking the part 1 through the closed end links of the chain to be joined. Then the part 3 is positioned as shown in FIG. 1 and the outwardly V-shaped notches 7 formed between the faces 14 and 15 are filled with weld metal as illustrated at 13 on the right in FIG. 2. Normally a thin welding rod can be used to weld the bases of these notches 7, then a thicker one is used to fill up the notches 7. The result is a very strong link which, since it is of greater cross section in the region of the part 3, will be as strong as the other links of the chain. Furthermore since the extra strengthening material is on the inside of the link, this connecting link 1, 3 will run as smoothly as the other closed links of the chain it is incorporated in.

FIG. 6 through 10 show another link much like that of FIGS. 1 through 5. It has a main part 1' with ends 2' and a filler part 3'. Here, however, the filler part 3' is substantially longer than in FIGS. 1 through 10 and the end surfaces of the main part 1' and filler part 3' are each subdivided into first and second planar end faces 14' and 15' and a planar third end face 11 and 12. The end faces 11 and 12 are set back from the respective faces 14' and 15' to form small generally triangular surfaces 16 and 17 that extend parallel to the axis 5 but lie in a plane perpendicular to the edges 4' an 6'.

This structure forms points 8 and 9 on the ends 2' and filler part 3', respectively, that engage together at the surfaces 16 and 17, making it fairly easy to position the filler part 3' in place while notches 10 are filled with weld metal within the region bounded by the dashed lines.

I claim:

1. A chain connecting link comprising:

a C-shaped main part of predetermined cross-sectional size and having a pair of ends with confronting and spaced end surfaces;

a separate filler part of greater cross-sectional size than the main part, engaged between the ends, and having a pair of oppositely directed end surfaces confronting the end surfaces of the main-part ends, each of the end surfaces being formed by a pair of substantially planar faces meeting at a straight edge, the straight edges extending generally in a plane including a longitudinal center axis of the link the faces forming four laterally open V-shared notches, a portion of extra cross-sectional size of the filler part projecting inward into the link such that an outside periphery of the link is substantially symmetrical to the axis; and respective bodies of weld metal filling the notches between the main-part end surfaces and the filler-part end surfaces, whereby the filler part solidly interconnects the ends of the main part.

2. The chain connecting link defined in claim 1 wherein the parts are both made of tempered and annealed steel.

3. The chain connecting link defined in claim 1 wherein the faces of each surface lie at an obtuse angle to each other.

4. The chain connecting link defined in claim 1 wherein the edges are rounded.

* * * * *